April 3, 1934.　　　　C. S. BROWN　　　　1,953,585
HEAT INSULATED VESSEL
Filed April 28, 1932
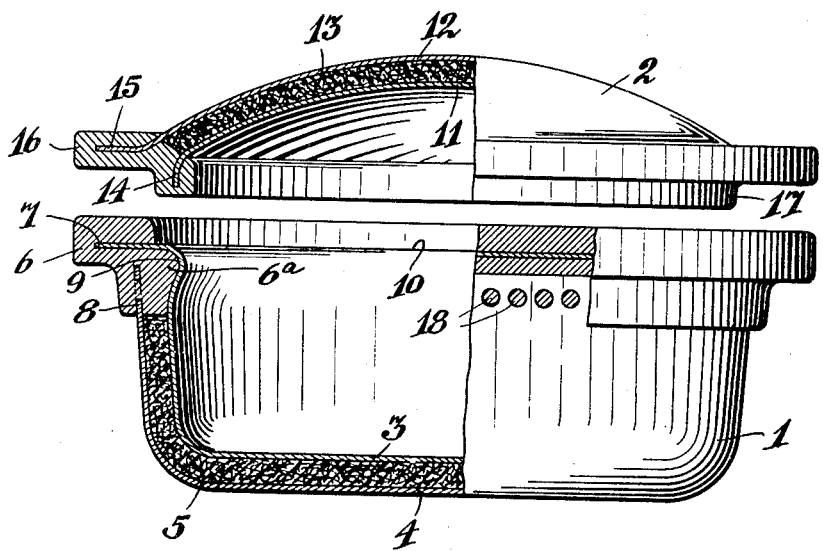
INVENTOR:
Charles S. Brown
BY Bodell + Thompson
ATTORNEYS.

Patented Apr. 3, 1934

1,953,585

UNITED STATES PATENT OFFICE 1,953,585

HEAT INSULATED VESSEL

Charles S. Brown, Syracuse, N. Y.

Application April 28, 1932, Serial No. 608,034

6 Claims. (Cl. 220—9)

This invention relates to heat insulated vessels, particularly vessels in which food may be served while hot and kept hot, or while cold, and kept cold, and has for its object, a particularly simple and efficient construction and arrangement of inner and outer metal walls of the vessel with heat insulation between them for keeping the food in prime condition and protecting the finish of the table against burning and of a non-metallic heat insulating rim joining the walls to the non-metallic rim for handling and for heat insulating the walls at their margins. It further has for its object the relative arrangement of the margins of the metal to the rim in which they are embedded, and to each other.

In describing this invention, reference is had to the accompanying drawing, which is an elevation, partly broken away, of a serving vessel, including a dish and a cover therefor, the cover being shown as partly separated from the dish.

1 designates the dish and 2, the cover. The dish comprises inner and outer walls 3 and 4, which are spaced apart with heat insulation 5 filling the space between the walls, and as here shown, each of the walls 3, 4 is a single-dished piece of sheet metal formed up to provide bottom and side walls. The insulation 5 may be compressed in cup-shaped form before assembled in the part 4 and may be asbestos or asbestos composition.

6 is the rim of non-metallic material, preferably of bakelite, this being heat resisting and heat insulating. The margins 7 and 8 of the inner and outer walls 3, 4 are embedded in the annular bakelite rim 6, and the embedded margins extend into the rim in directions at approximately a right angle to each other, but are spaced apart. Preferably, the margin 7 of the inner wall 3 extends horizontally into the bakelite rim 6 while the margin 8 of the wall 4 extends nearly vertically.

The inner wall 3 is provided with a corrugation for compensating somewhat for the greater expansion and contraction of the inner wall 3 relative to the outer wall, by reason of the inner wall being in contact with the hot food to be kept hot, or the cold food to be kept cold.

9 designates the corrugation, which is preferably annular and located adjacent the rim 6 on the inner side thereof, the corrugation also forming a second sealing ledge 10 for the cover.

The cover 2 like the disk 1 is formed of inner and outer sheet metal walls 11 and 12 spaced apart with heat insulating material 13 between them, and the margins 14 and 15 are embedded in an annular rim of bakelite 16, these margins extending in directions at a right angle to each other. The rim 16 is complemental or mates with the rim 6 and is formed with a lip portion 17 for resting on the ledge 10 formed by the corrugation 9.

The margins of the walls 3, 4 and 11, 12 are formed with suitable means, by which the bakelite can be moulded under pressure around the same in tight interlocking engagement therewith, and as here shown, the margins are formed with perforations 18, through which the bakelite is pressed when being moulded. This method also strengthens the bakelite by tying the bakelite on opposite sides of the perforated margins together through the perforations, so as to avoid weakening and splitting of the rim. The rim 6 also has a head 6ª complemental to the corrugation 9. The walls 3, 4 will expand or contract under the influence of heat or cold respectively, and due to the fact that these walls 3, 4 are heat insulated from each other, they will expand and contract in different proportions, that is, one wall will expand or contract more or less than the other.

Owing to the relative right angular arrangement of the margins of the inner and outer walls to each other in the rim 6, each wall can expand and contract independently of and without affecting the other or distorting the rim 6.

Forces due to expansion of the inner wall 3 or contraction of the outer wall 4 will react against the insulating material 5 between the walls at the bottom of the vessel, but due to the corrugation 9, these forces will not be transmitted to the rim 6, but will be nullified by the corrugation 9.

Owing to the fact that the rim 16 mates with the rim 6 and owing to the insulation between the inner and outer metal walls of the dish and the cover, the food within the dish is entirely insulated from the outside temperature and the outer wall from the inside temperature. The asbestos filler also protects the walls from indentations.

What I claim is:

1. A heat insulated vessel comprising a dish having inner and outer walls of sheet metal, said walls being spaced apart, heat insulation filling the space between the walls, and an annular rim of non-metallic heat resisting material, the margins of the inner and outer walls being embedded in said rim, the portions of the margins embedded in said rim extending in directions approximately at a right angle to each other, whereby the expansion and contraction of the inner and outer walls is transmitted by the margins to the rim in directions at an angle to each other.

2. A heat insulated vessel comprising a dish having inner and outer walls of sheet metal, said walls being spaced apart, heat insulation filling the space between the walls, and an annular rim of non-metallic heat resisting material, the margins of the inner and outer walls being embedded in said rim, the portions of the margins embedded in said rim extending in directions at approximately a right angle to each other, whereby the expansion and contraction of the inner and outer walls is transmitted by the margins to the rims in directions at an angle to each other, one of the walls being formed with a corrugation for compensating for expansion and contraction.

3. A heat insulated vessel comprising a dish having inner and outer walls of sheet metal, said walls being spaced apart, heat insulation filling the space between the walls, and an annular rim of non-metallic heat resisting material, the margins of the inner and outer walls being embedded in said rim, the portions of the margins embedded in said rim extending in directions at approximately a right angle to each other, whereby the expansion and contraction of the inner and outer walls is transmitted by the margins to the rims in directions at an angle to each other, the inner wall being formed with a corrugation compensating for expansion and contraction of the inner wall.

4. A heat insulated vessel comprising a dish having inner and outer walls of sheet metal, said walls being spaced apart, heat insulation filling the space between the walls, and an annular rim of non-metallic heat resisting material, the margins of the inner and outer walls being embedded in said rim, the portions of the margins embedded in said rim extending in directions at approximately a right angle to each other, whereby the expansion and contraction of the inner and outer walls is transmitted by the margins to the rims in directions at an angle to each other, the inner wall being formed with a corrugation compensating for expansion and contraction of the inner wall, said corrugation being annular and located adjacent the rim.

5. A heat insulated vessel comprising a dish having inner and outer walls of sheet metal, said walls being spaced apart, heat insulation filling the space between the walls, and an annular rim of non-metallic heat resisting material, the margins of the inner and outer walls being embedded in said rim, the portions of the margins embedded in said rim extending in directions at approximately a right angle to each other, whereby the expansion and contraction of the inner and outer walls is transmitted by the margins to the rims in directions at an angle to each other, the inner wall being formed with a corrugation compensating for expansion and contraction, said corrugation being annular and located adjacent the rim.

6. A heat insulated vessel comprising a dish having inner and outer walls of sheet metal, said walls being spaced apart, and an annular rim of non-metallic heat resisting material, the margins of the inner and outer walls being spaced apart and having their margins embedded in said rim and extending in directions at an angle to each other.

CHARLES S. BROWN.